(12) United States Patent
Cronce (10) Patent No.: US 6,880,149 B2
(45) Date of Patent: Apr. 12, 2005

(54) METHOD FOR RUNTIME CODE INTEGRITY VALIDATION USING CODE BLOCK CHECKSUMS

(75) Inventor: Paul A. Cronce, San Jose, CA (US)

(73) Assignee: Pace Anti-Piracy, San Jose, CA (US)

( * ) Notice: Subject to any disclaimer, the term of this patent is extended or adjusted under 35 U.S.C. 154(b) by 550 days.

(21) Appl. No.: 10/114,536

(22) Filed: Apr. 1, 2002

(65) Prior Publication Data

US 2003/0188231 A1 Oct. 2, 2003

(51) Int. Cl.[7] ................................................. G06F 9/44
(52) U.S. Cl. .................. 717/126; 717/124; 717/139; 713/165; 713/166; 714/38; 714/48
(58) Field of Search ................................. 717/124, 126, 717/139, 140; 714/38, 48, 41, 58, 21, 6; 713/165–166, 100

(56) References Cited

U.S. PATENT DOCUMENTS

| | | | | |
|---|---|---|---|---|
| 5,598,530 A | * | 1/1997 | Nagae | 714/21 |
| 5,832,240 A | * | 11/1998 | Larsen et al. | 710/105 |
| 6,219,818 B1 | * | 4/2001 | Freivald et al. | 714/799 |
| 6,272,649 B1 | * | 8/2001 | Hayward et al. | 714/6 |
| 6,357,021 B1 | * | 3/2002 | Kitagawa et al. | 714/41 |
| 6,581,052 B1 | * | 6/2003 | Slutz | 707/2 |
| 6,622,246 B1 | * | 9/2003 | Biondi | 713/100 |
| 6,678,822 B1 | * | 1/2004 | Morar et al. | 713/182 |
| 6,708,169 B1 | * | 3/2004 | Berry et al. | 707/7 |
| 6,738,932 B1 | * | 5/2004 | Price | 714/38 |
| 6,769,114 B2 | * | 7/2004 | Leung | 717/124 |
| 6,772,410 B1 | * | 8/2004 | Komatsu et al. | 717/124 |

OTHER PUBLICATIONS

TITLE: Performance of Checksums and CRC's over Real Data, author: Stone et al, IEEE, 1998.*
TITLE: Reflecting as a Mechanism for Software Integrity Verification, author: Spinellis, ACM, 2000.*
TITLE: Design of Systems with concurrent error detection using software redundancy, author: Hua et al, IEEE, 1986.*

* cited by examiner

Primary Examiner—Chameli C. Das
(74) Attorney, Agent, or Firm—Sawyer Law Group LLP (57) ABSTRACT

The present invention provides a method and system for runtime code integrity validation. The method and system include providing a software tool for processing a software program, as well as instructions on how to modify the software program for submission to the tool. The modified software program executable generated for submission to the tool includes checksum information for use by the tool. The tool uses the checksum information to compute checksums on blocks specified by the checksum information, and stores the computed checksums in locations specified by the checksum information. Next, the tool strips the checksum information from the executable. The resulting executable code is delivered as a protected software application that generates a new checksum at runtime and compares it with the computed checksum, and determines that the software program has been modified if the checksums fail to match.

36 Claims, 10 Drawing Sheets

Prior Art

Figure 1

Prior Art

METHOD FOR RUNTIME CODE INTEGRITY VALIDATION USING CODE BLOCK CHECKSUMS

FIELD OF THE INVENTION

The present invention relates to software piracy detection and prevention, and more particularly to detecting code modifications made to bypass anti-piracy functions and taking appropriate action to make continued use of the pirated software less desirable.

BACKGROUND OF THE INVENTION

The problem of software piracy is well known in the computer industry. This problem results in substantial losses for software developers. Many methods have been used to try to prevent unauthorized use of software over the years, with limited success. Typically, the effort put out to break protection schemes is proportional to the value of the protected software. Thus, if a software program has high demand, such as a computer game, or has a high cost per unit, such as a professional tool sold to a small market, it is likely to be attacked by software hackers for the purpose of creating an unprotected version of the product. This unprotected version is then made available to others at low cost or free via the Internet or other means.

The impact on developers is substantial. In fact, this problem is so severe in some industries, such as the music recording industry and computer games industry, that some companies are unable to guarantee the profitability of developing new software.

Some of the methods of protecting software from piracy include encryption schemes, digital signatures, and the use of license files of various types. These schemes work fairly well, but typically have a serious weakness if attacked appropriately. This weakness is a single point of validation within the protected software, typically prior to the execution of the main application program code. If this single point can be located and neutralized, no matter how hack-proof the validation process is, once it is disconnected from the application, it is no longer able to perform the desired validation function. Most protection schemes have a single or small number of points, localized in code and usually localized in time of execution prior to, or at the beginning of, the application execution, making it easier for a hacker to locate and neutralize. Additionally, the code used to perform validation is typically identical in every instance for a given method, and thus easy to locate using a pattern-matching search. Once neutralization has been accomplished, the application typically runs correctly with no validation required.

Accordingly, what is needed is an anti-piracy method that runs during the normal execution of the application, validating the software over a period of time rather than prior to the execution of the main application. Additionally, what is needed is a method that allows the validation code to be customized and located in multiple places within the code base, thus increasing the difficulty of any attempts to locate and neutralize it. Finally, what is needed is a method that allows custom variations to the required validation code to prevent location by simple pattern matching of the code. The present invention addresses such a need.

SUMMARY OF THE INVENTION

The present invention provides a method and system for runtime code integrity validation. The method and system include providing a software tool for processing a software program, as well as instructions on how to modify the software program for submission to the tool. The modified software program executable generated for submission to the tool includes checksum information for use by the tool. The tool uses the checksum information to compute checksums on blocks specified by the checksum information, and stores the computed checksums in locations specified by the checksum information. Next, the tool strips the checksum information from the executable. The resulting executable code is delivered as a protected software application that generates a new checksum at runtime and compares it with the computed checksum, and determines that the software program has been modified if the checksums fail to match.

According to the system and method disclosed herein, the present invention allows the application to validate code base integrity during normal execution, and allows the programmer to place the validation code in multiple locations within the code base. The programmer is also allowed to customize validation code to prevent location using pattern-matching searches. Therefore, it will be much more difficult for a hacker to determine the location and time of execution of validation code within the application and thus make it more difficult to defeat the anti-piracy features of the application.

DETAILED DESCRIPTION

The present invention relates to a method and system for runtime code integrity validation. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein Referring to FIG. 1, a block diagram of an example application using a conventional runtime validation process is shown. Application software 100 in this example has been configured to compute a checksum at startup to validate that no changes have occurred to the software. This checksum may be part of a digital signature, for example, and may use a message digest algorithm such as MD5. Digital signatures and message digest algorithms are well known to those of ordinary skill in the art, and will not be described in detail herein.

Figure 1:
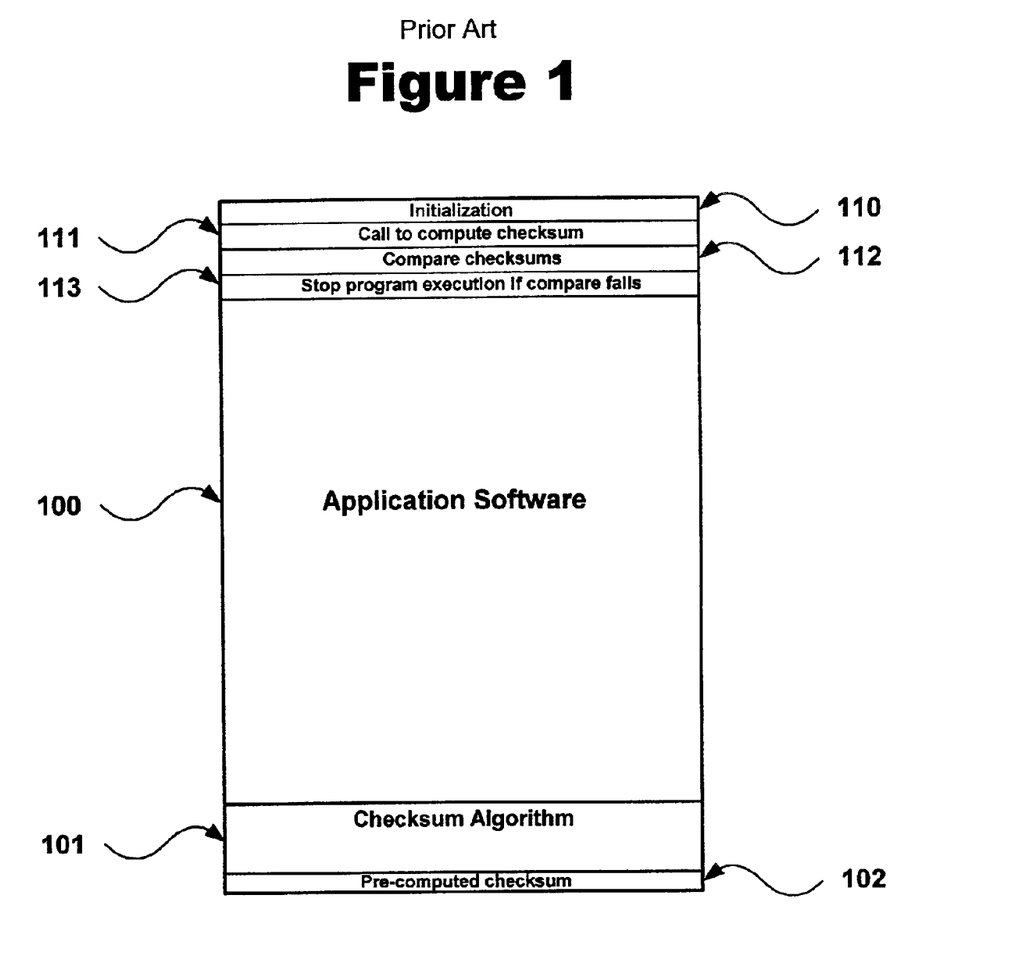
FIG. 1 is a block diagram of an example application using a conventional runtime validation process.

Application 100 begins with initialization code 110, which sets up the computer and system resources for normal operation. During the early part of execution, a function call 111 is made to a checksum computation routine 101 to compute the checksum on the program or some portion thereof. Next, comparison code 112 compares the results of the checksum computation from routine 101 with a pre-computed checksum 102 stored within the program. In the case of a digital signature, the pre-computed checksum is stored within the digital signature itself. If the checksums compare, then the code is not changed, and execution begins of the main application code 100. If the checksums do not compare, the application program 100 does not normally execute. This can take many forms. For example, a dialog box can appear on the screen telling the user that the code has been modified and cannot execute properly. Another approach is to disable some critical function of the program, such as the ability to save files. Yet another approach is for the program to crash, or set up a key routine to crash later during normal operation.

The problem with this conventional runtime validation process is the single control point for validation. Specifically, validation is done during or immediately after initialization 110, making the validation code easier to locate. Second, a single call 111 is made to the routine 101 to compute the checksum, and a single value is returned. This value is then compared with the pre-computed checksum 102. If the comparison fails, action is taken immediately or fairly immediately. Although some approaches delay the action to try to foil hackers, the single control point 111 still remains, close to the beginning of the program execution flow. Note that this does not necessarily mean that the code is physically located near the beginning of the application, but rather executes early in the application, thus making it easier to locate by tracing the execution of the application program.

Figure 2:
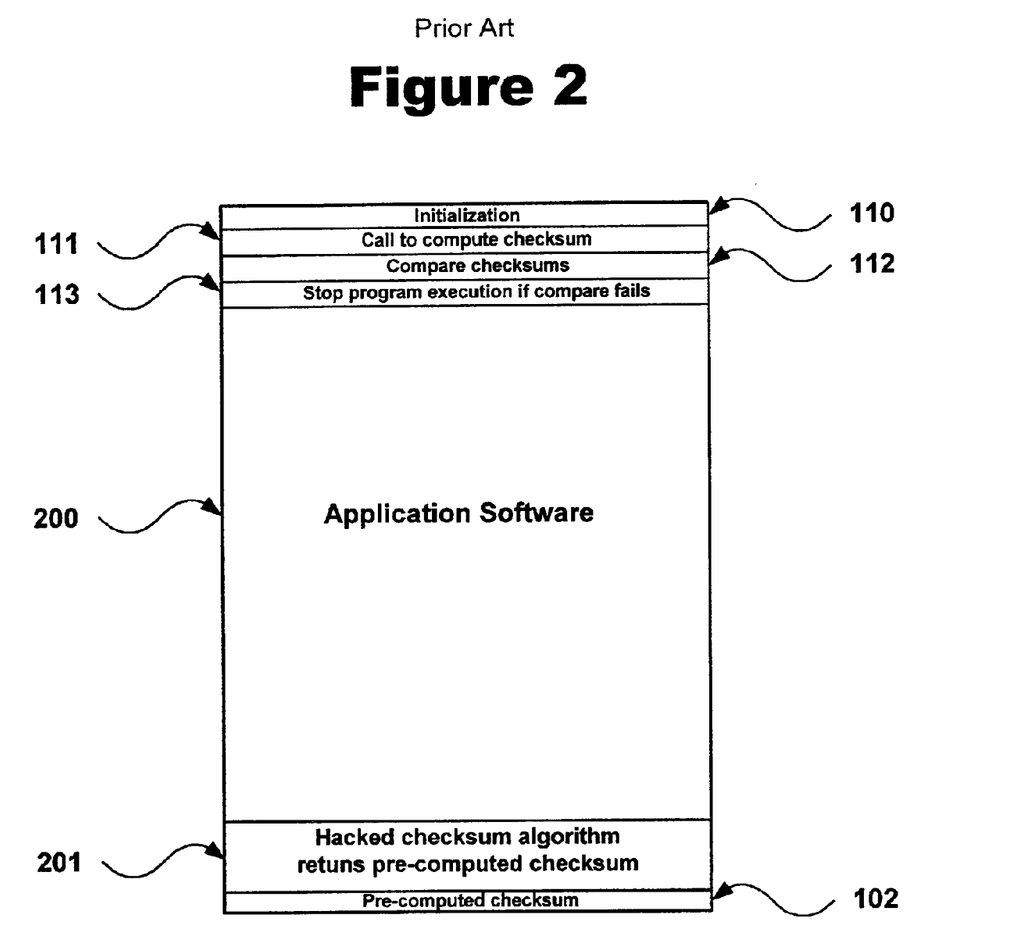
FIG. 2 is a block diagram of the conventional application after being hacked.

Referring now to FIG. 2, a block diagram of the conventional application after being hacked is shown. In this particular example, a hacker has located the function call 111, and modified the original checksum routine 101 into hacked routine 201, such that the routine 201 does not actually compute anything, but rather retrieves the pre-computed checksum 102 and returns it to the caller. The hacked routine 201 is inserted in the same location as the original routine 101, and any changes to the program, including the changes to the checksum algorithm 101 will have no effect on the checksum value returned. The comparison routine 112 will always find the pre-computed checksum 102 will be identical to the computed value returned by hacked routine 201. The hacked application program 200 will operate normally, having failed to detect any changes to the application code.

Another potential weakness of the conventional runtime validation process is the utilization of a standard checksum library function. In this case, it is easy for the hacker to locate the standard algorithm 101 by a pattern-matching search through the application code, or by checking for calls to system library functions with exported names.

Previous attempts to make it more difficult for a hacker have included delaying the reaction when the comparison routine 112 returns a failure. The value of this approach is in making it more time consuming to locate the cause of the failure in the application, and more specifically to reduce the direct cause and effect relationship between the comparison failure and the application failure. This delay has proved helpful in increasing the effort to successfully hack an application program, but has not been sufficient to stop successful hacking and piracy.

Figure 3A:
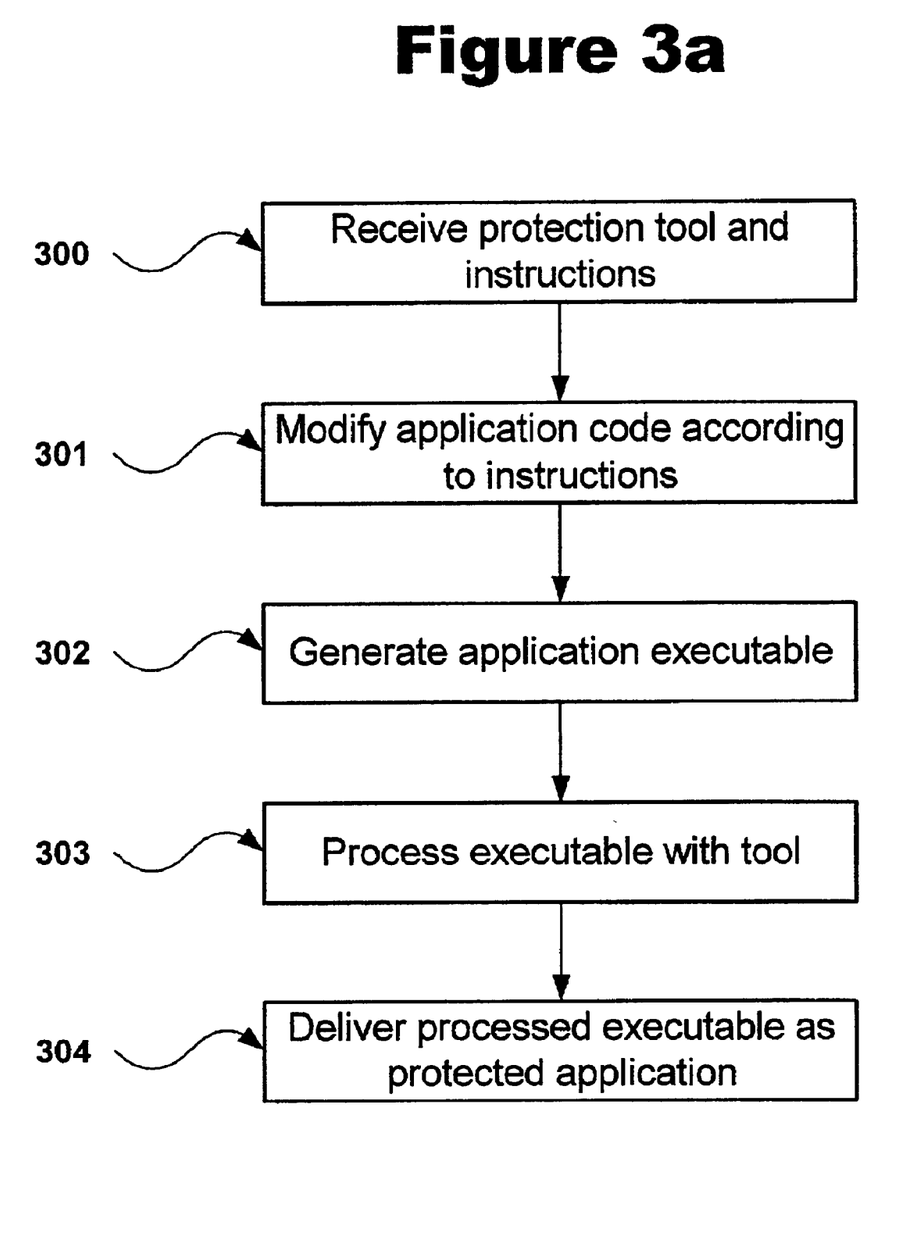
FIG. 3a is a flow diagram showing how a software developer uses the present invention to validate checksums during runtime.

The present invention provides a runtime validation process that significantly increases the hacking difficulty level by further obfuscation of the validation software and its relationship to the comparison routine 112 and any delayed action routines. Referring now to FIG. 3a, a flow diagram showing how a software developer uses the present invention to validate checksums during runtime is shown. It is assumed that the software developer already has created an application program, and now wishes to apply runtime checksum validation of the program code. In step 300, the software developer receives a software tool for implementing the present invention, along with instructions on how to prepare his application program to submit to the tool. In step 301, the developer modifies the application source code as directed by the tool provider. The required modifications for the preferred embodiment are described in detail below in relation to FIG. 7. In summary, exported symbols are created in the application for the tool to use when processing the application, and other modifications are made in the application to implement all required run-time functions required by the present invention. Other embodiments are possible for providing the tool with the required checksum information. Some of these embodiments will be described below. Other embodiments will be apparent to one of ordinary skill in the art, and thus will not be discussed in more detail herein.

In step 302, the developer generates the executable code module containing the modifications and exported symbols. In step 303, the executable code module is submitted to the tool for processing. During processing, checksums are calculated and stored in the executable, at locations defined by the exported symbols. The exported symbols are then stripped from the executable, and the resulting processed executable is stored for use. In step 304, the processed executable is delivered as the protected application, complete with run-time checksum validation according to the present invention.

Figure 3B:
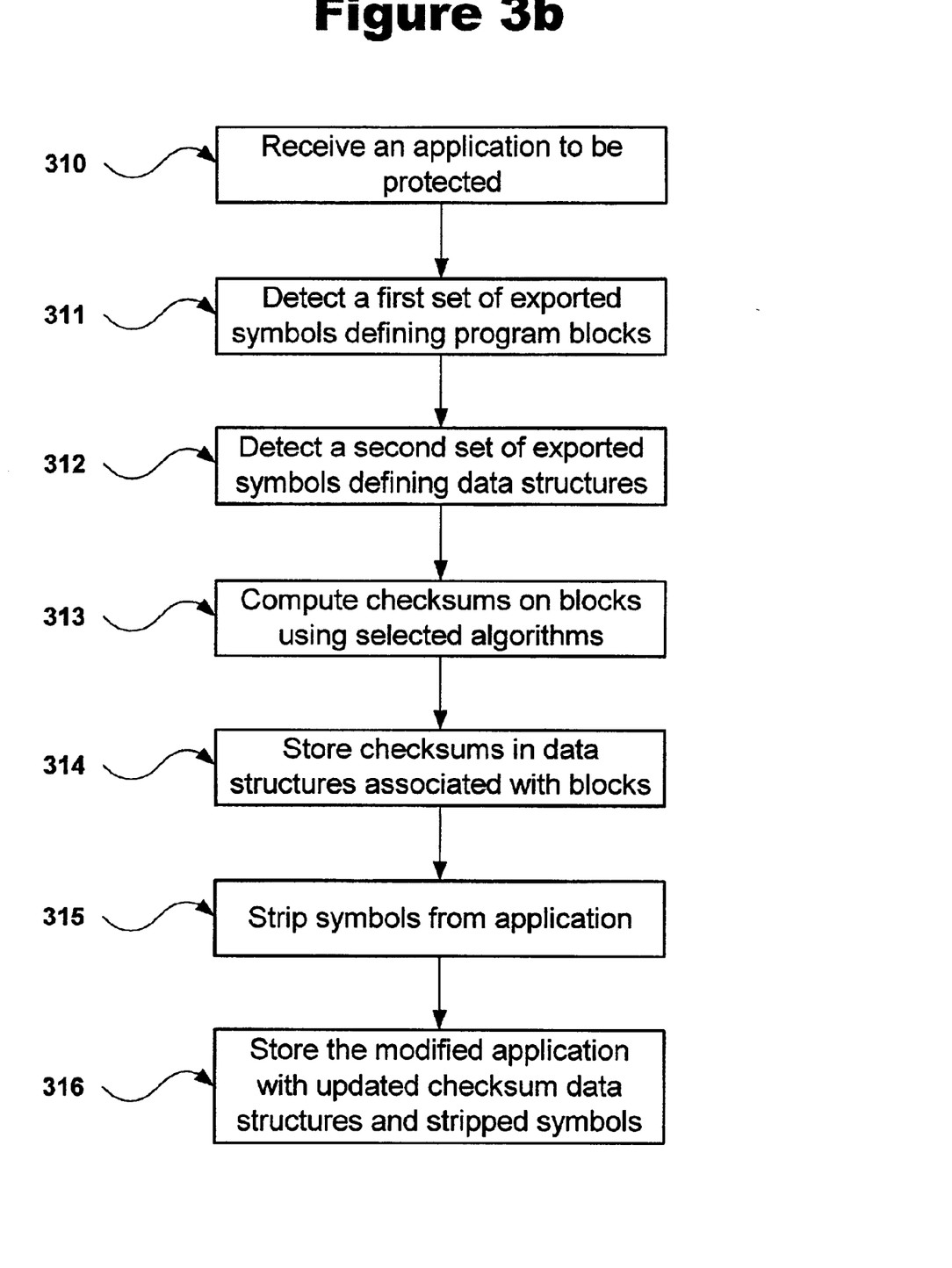
FIG. 3b is a flow diagram of the process used by a software tool to prepare a modified application for run-time checksum validation.

Referring now to FIG. 3b, a flow diagram of the process used by the tool to prepare a modified application for run-time checksum validation is shown. In the preferred embodiment, this process is built into a tool for wrapping anti-piracy protection software around an application program. The method for preparing the application program for submission to this tool is described in detail below in relation to FIG. 7. Although the present invention will be described in terms of a preferred embodiment where anti-piracy protection software is wrapped around the application for run-time validation, the run-time validation process of the present invention may be implemented without using the additional anti-piracy software.

In principle, the concept of wrapping an application with anti-piracy protection is effectively to provide a more elaborate initialization procedure that executes prior to the application code itself. The wrapper may provide services such as decryption of encrypted portions of the application (encrypted during wrapping), digital signature verification, and other functions. One of the functions the wrapping software may additionally provide to enhance anti-piracy protection is the present invention.

The process used by the software tool according to the present invention begins in step 310, where the prepared software application is received for processing by the wrapping tool. In step 311, the tool detects a first set of exported symbols within the application that define the start and end of program blocks to be protected by runtime checksum validation. These symbols are effectively locations within the application code, and are recognized in the preferred embodiment by a naming convention, described in more detail below. In step 312, a second set of exported symbols is detected that define the starting address of a checksum data structure. In the preferred embodiment, the second set is also detected by a naming convention, as with the first set of exported symbols. There is one checksum data structure defined for each pair of start and end symbols.

Figure 4A:
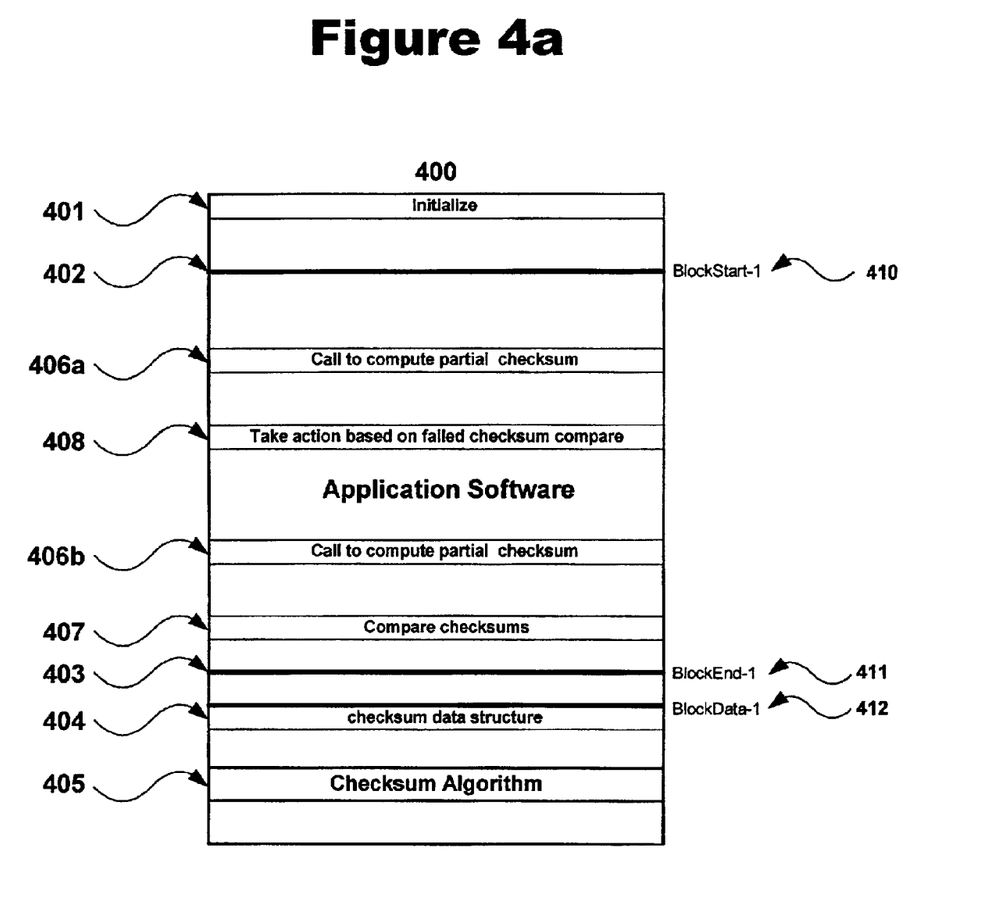
FIG. 4a is a block diagram of an application program built according to the present invention.
Figure 4B:
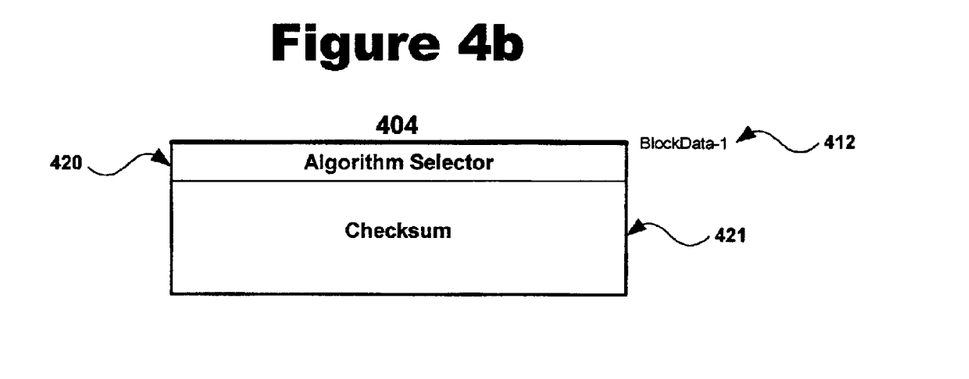
FIG. 4b is a block diagram of the checksum data structure in the preferred embodiment.

Referring now to FIG. 4b, a block diagram of the checksum data structure in the preferred embodiment is shown. Data structure 404 contains two components: an algorithm selector 420, and space for a checksum 421 of the length required for the selected algorithm. A typical length is 16 or 20 bytes. The selector 420 can be a single byte, and the value is used to select from a small number of available checksum algorithms. For some compilers, a 4-byte value is required to maintain alignment on memory 32 bit boundaries. Alternatively, a single algorithm can be used, and no selector is required. In addition, the checksum data structure may include an initialization vector to use with the selected algorithm.

Some typical checksum algorithms include the MD5 message digest algorithm, the SHA message digest algorithm, and the Adler32 checksum algorithm. Each algorithm has advantages and disadvantages, such as execution speed, code size, and security level. These algorithms are well known to one skilled in the art, and will not be described in more detail herein. However, it should be noted that in the preferred embodiment, only algorithms that can compute the checksum in a series of random-sized segments are used, to allow the checksum operation to be interspersed with normal code execution over an extended period of time.

Referring again to FIG. 3, in step 313, the selected algorithms are used to compute the checksums for the specified program blocks. There can be a single defined block, or multiple blocks can be defined. Blocks can be overlapping, where the checksum of one block is actually part of a different block. Overlapping blocks present a special situation, and must be handled by an appropriate algorithm. It is possible to construct a set of overlapping blocks and checksum data structures that cannot be computed. The checksum computation order algorithm and error condition detection will be described in detail below in relation to FIG. 9.

Next, in step 314, the computed checksums are stored in the checksum data structures. In step 315, the first and second set of exported symbols is stripped from the application, in order to obfuscate the location of blocks and checksum values and the use of this invention within the application. Finally, in step 316, the modified application with updated checksum data structures and stripped symbols is stored, and is ready for use. After this wrapping process, the application is ready for runtime validation. The runtime operation of this invention will be described in detail below in relation to FIG. 7 and FIG. 8.

In the preferred embodiment described above, the checksum information provided to the tool by the executable is in the form of exported symbols. There are many other ways to provide the checksum information. Effectively, the checksum information must allow the tool to locate the desired block(s), and provide a place to store the computed checksum(s). If more than one algorithm is supported by the tool, a means for selecting the algorithm must be provided, either as a preference setting for the tool, or as an additional selector(s) in the checksum information.

For computers with program code using relative addressing, such as the Macintosh computer by Apple Computer, Inc., the program blocks are not modified at load time, and thus can be used to compute checksums. However, computers based on operating systems such as Windows from Microsoft Corporation modify the program code during load time. For example, jump instructions require absolute addresses in memory, and must be computed at load time and stored within the program code. For this reason, the tool must provide a way for checksums to be computed for these operating systems. One method is for the tool to generate a table of locations to skip over when computing the checksum. This table could contain a list, or could be in the form of run-length codes specifying the areas of alternating fixed and changed program space. In this case, the runtime algorithms must utilize the table so that checksums are only computed on the portions of code that are not modified during the load process.

Another method for providing checksum information to the tool is to store it as a resource, either as a separate file, or in a known searchable location within the executable. Whatever form the checksum information takes, it is critical that the information can be stripped from the executable once the tool has completed using the information, in order to prevent a hacker from using the information to defeat the checksum validation mechanism. Many methods of providing the checksum information will be apparent to one of ordinary skill in the art, and thus will not be described in detail herein.

Figure 7:
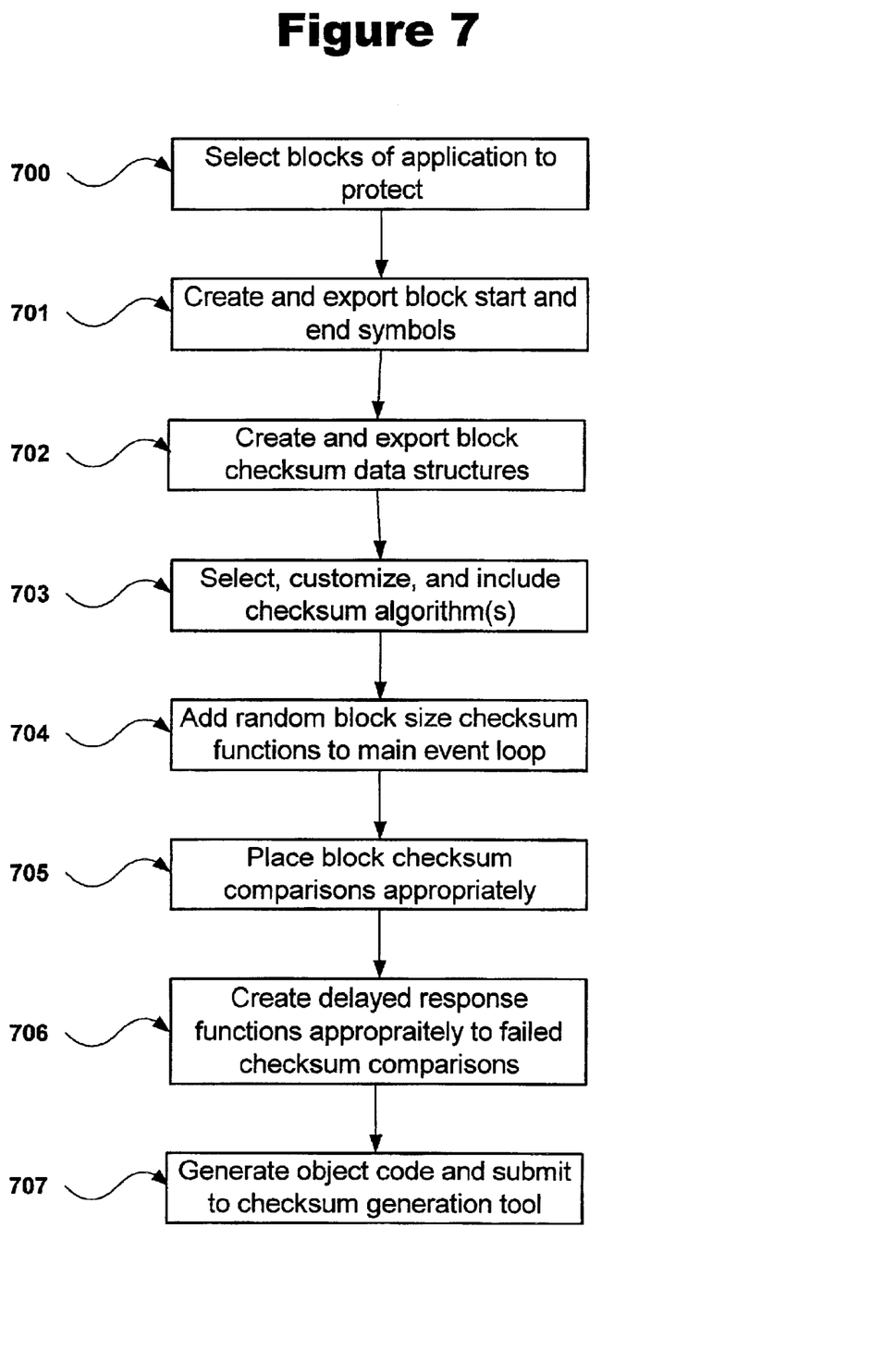
FIG. 7 is a flow diagram of the method for creating an application to be protected using the present invention

Referring now to FIG. 7, a flow diagram of the method for creating an application to be protected using the preferred embodiment of the present invention is shown. This is the detailed method that is followed by the application software developer. As described above, the creator of the wrapping tool would provide the developer with instructions on how to modify an application for use with the tool. All steps from step 700 through 706 can be done in any order. In step 700, the developer selects one or more blocks of program code on which to do runtime checksum validation. In the simplest case, only one block is selected, covering all critical portions of the code, including the validation code. In step 701, the required exported symbols for block start and end are created in the source code. In step 702, the checksum data structures are created, including the required exported symbols, and placed within the code base in consideration of the placement requirements described below in relation to FIG. 9.

In step 703, the developer selects one or more checksum algorithms, depending on his choice of code size, code accessibility, code speed, and execution performance. In the preferred embodiment, the checksum algorithm is in source code form, preferably acquired from one of multiple sources, and custom modified by the developer in such a way as to not change the function, but to rearrange the code. This will effectively obfuscate the executable version of the code, making it extremely difficult to locate by a pattern-matching search.

In step 704, code that selects random sized segments in sequence from the defined code blocks is placed within the application, activated from events detected in the main event loop. The events can be set up at various other points in the application. Each event triggers a short run of the checksum algorithm for an additional random sized segment of the code block being verified. Each checksum segment in the preferred embodiment is short, and consumes a small amount of processing power from the CPU, making it harder to detect. After each run, the intermediate results are maintained, either by the algorithm or by the main application. When the last segment of a block completed, the results are placed in an appropriate location for use with a future event. This sequential random-sized segment process is described in more detail in relation to FIG. 4a and FIG. 8 below.

In the preferred embodiment, multiple versions of the random block checking code are used within the application for partial computation of checksum results. Events used to trigger operation of these hidden code modules should be as indirect as possible, including time delays after user or system events. The more indirect the interaction between the main event loop and the random segment partial checksum process, the more difficult to locate and defeat by a hacker. These programming chores are left to each application programmer to prevent a standardized approach that could easily be located and defeated.

In step 705, code is inserted in the application to process the checksum results to determine if there is a match. The results of this comparison are also stored in an appropriate location for use with a future event. An appropriate event, such as a timer, a user event, a system event, or combination of user, timer, and system events activate this code. In the preferred embodiment, the execution of the comparison routine is not triggered by the event of completing the checksum calculation, but rather triggered from some combination of events that happen with sufficient frequency to ensure reliable detection. If the comparison detects incomplete checksum data, no action will be taken. This approach further obfuscates the function of the comparison code. Determining that checksum computation is incomplete can be accomplished by many different methods, well known to one skilled in the art, and thus will not be described herein.

In step 706, code is created and placed in the application that will detect a failure of checksum validation in step 705, and take developer-specified action. In the preferred embodiment, such action taken is delayed from the detection of validation failure from code placed in step 705, and is subtle in nature. Specifically, there are no dialog boxes telling the user that the code has been hacked. Rather, the application begins to work improperly in some way that is not immediately apparent, and, in fact, is impossible to distinguish from a program bug. Detecting the failure can be as delayed as having files generated by the hacked program lose important data over time, such that the application becomes undependable. The goal here is to discredit the reputation of the hacker and make it clear to the user that the pain of using a hacked application is not worth it. If a user loses multiple days worth of work in a delayed reaction to the program discovering that it was hacked, it may dissuade the user from using hacked programs in the future, and will diminish the value of the hacker in the eyes of the user.

Finally, in step 707, when all the code revisions in step 700 through step 706 are complete, the application executable is generated, and submitted to the checksum generation tool of the present invention. The tool generates the final executable object, as described in relation to FIG. 3b above.

In order for a hacker to locate the hidden checksum functions, which execute deep inside the normal activity of the application, the hacker must wade through millions of instructions being executed by the normal application code. In the conventional approach, these routines execute very shortly after the application launch, and thus require much less instruction tracing to locate. The shear volume of executing instructions from the main application is effective in hiding the checksum validation routines.

Referring now to FIG. 4a, a block diagram of an application program built according to the present invention is shown. The application includes a block start exported symbol 410 and block end exported symbol 411 related to the block start location 402 and block end location 403, a checksum data structure 404 and related exported symbol 412, one or more calls to compute a partial checksum 406a and 406b, a checksum comparison routine 407, and action routines 408 to handle the case where the checksums do not compare, preferably with delayed effect. Also included are one or more checksum algorithms 405. Note that application 400 has a similar initialization routine 401 at the beginning of execution, but there is no call to the checksum algorithm 405, or comparison code 407 required prior to the execution of the main program code, as in the conventional approach. Rather, the required code modifications are built within the main application, as shown.

According to present invention, several techniques are used to distribute the required code functions throughout the application code. Specifically, the call to the checksum algorithm 405 can be located in more than one place (406a and 406b in the example). Second, rather than a single call for a single block, many calls are required to complete a single checksum. This is accomplished by only computing a partial checksum on each call 406, for a randomly sized segment of the current block. The randomly sized segments must typically be selected in progressive order through the block, because most algorithms are sensitive to the order of the data. However, most algorithms can be fed portions of the data over time. This allows a very small computation to occur at irregular intervals, controlled by various mechanisms of the application programmer's choosing. Typically, timers and specific actions by the user or operating system can be used to trigger partial checksum computations. Also, checksum computation calls 406a and 406b, for example, can be placed at multiple locations in the application code. Likewise, the checksum 404 and the comparison code 407 can be located anywhere within the application 400. Finally, the action code 408 can be located in a different location within the application 400, and preferably can be delayed and non-obvious in its operation to devalue the function of application 400.

Exported symbols 410, 411, and 412 BlockStart-1, BlockEnd-1, and BlockData-1 represent the symbols exported by the application. The tool described above in conjunction with FIG. 3 uses these symbols to compute and store the checksums for the specified blocks within the checksum data structure 404. Other naming conventions can be applied. The software developer must be instructed appropriately for whatever convention is used.

Another method for obfuscation in the preferred embodiment is to provide source code for the checksum algorithm 405 to the application programmer, or to suggest retrieving one of the many implementations from the Internet for inclusion in the application. The application programmer is encouraged to make subtle modifications to the form of the algorithm in order to disguise it so it cannot be easily located by a pattern-matching search. The subtle modifications must of course not change the function of the algorithm. Note that the algorithm 405 must perform the same function at runtime as is performed by the algorithm copy within the tool.

Figure 5:
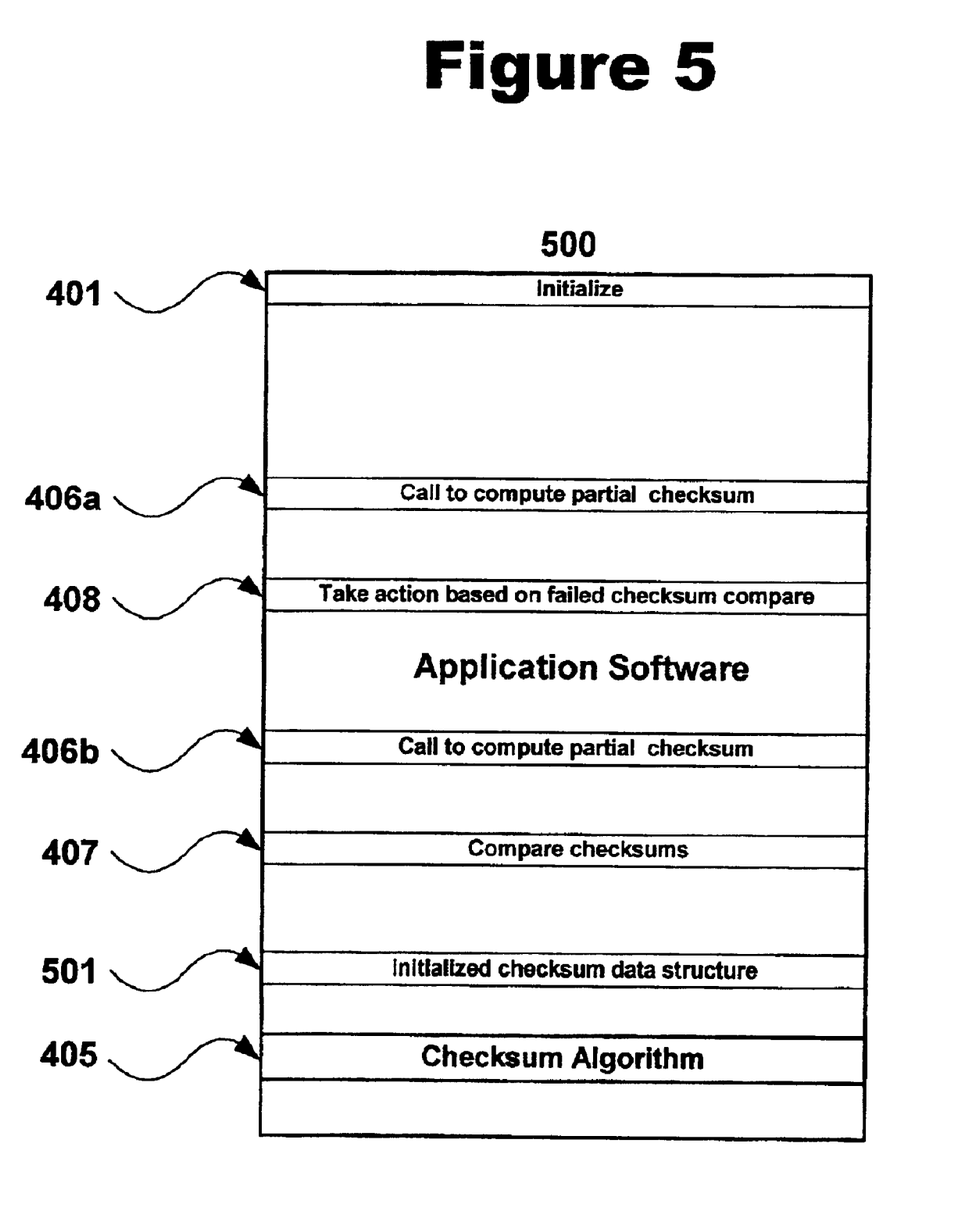
FIG. 5 is a block diagram of the final executable object after processing according to the present invention.

Referring now to FIG. 5, a block diagram of a final executable object after processing by the software tool according to the present invention is shown. Note specifically that there are no exported symbols available to locate checksum data structure 501, or the start and end of the block. Also note that checksum data structure 501 now contains the correctly computed checksum for the defined block. If the application programmer has done his work well, the various components of the runtime validation are now highly obfuscated and thus difficult to locate and defeat by a hacker.

Figure 8:
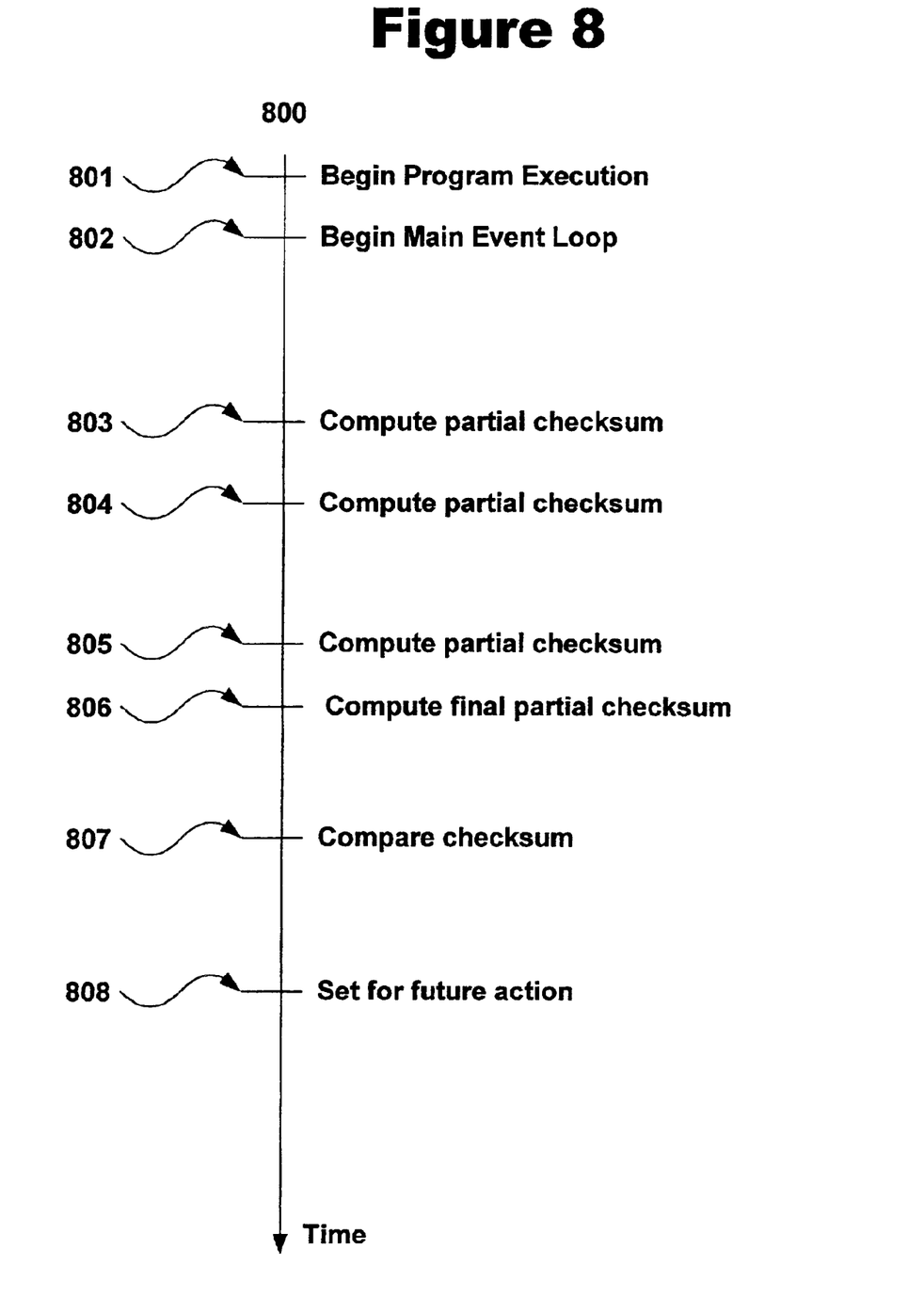
FIG. 8 is a timeline showing the execution of an example program using the present invention.

Referring now to FIG. 8, a timeline showing the execution of an example program using the runtime validation process of the present invention is shown. In this example, only one block is defined, and it is broken up into three random-sized segments, preferably at runtime. Thus, each execution of the program will use different sized segments and a different number of segments. At time 801, the application program begins execution. At some later point, after initialization, the main event loop begins operation at time 802. The main event loop sets up the required timers and other functions to generate future events to drive the checksum process. At time 803, the first event occurs for this purpose, and the checksum algorithm processes the first random-sized segment of the code block, with intermediate results saved. The checksum process occurs again from a different even at time 804, with the next random-sized segment. At time 806, the next event triggers the final segment processing, and the final results are stored. At time 807, a later event triggers the module that compares the results of the checksum calculation with the results from the tool-processing step 707. The results of this comparison are stored. Finally, at time 808, if the comparison failed at time 807, some setup for future actions takes place, affecting a delayed response to detecting a change in the application code at time 807.

If the comparison made at time 807 is successful, and more blocks were included, each block will be checked in preferably a random sequence. Once completed, the blocks can continue to be scanned continuously during the operation of the application. The scanning sequence can be random, and the size of segments within each block that are checked can be random, thus obfuscating the process and making it harder to detect and locate. Also, due to the location of the executable functions deep within the application, and the delayed execution from the application start, location by program execution trace becomes excessively burdensome, and therefore this commonly used technique for locating the anti-piracy functions is severely limited in usefulness.

Figure 6:
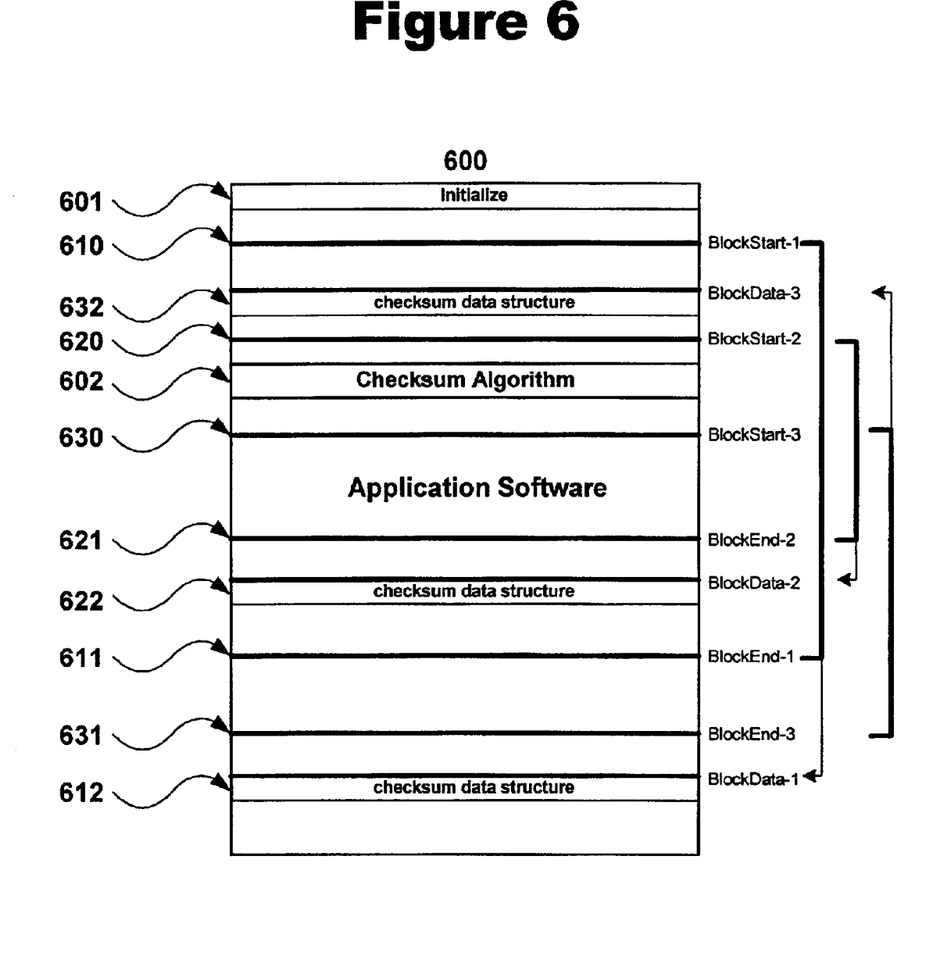
FIG. 6 is a block diagram of an application program built according to the present invention with multiple overlapping code blocks.

Referring now to FIG. 6, a block diagram is shown of an application program built according to the present invention where the exported symbols define multiple overlapping code blocks. In this example, there are three defined blocks. Block 2 is defined completely within block 1, while block 3 includes portions of both block 2 and block 1. The checksum for block 2 622 is stored within block 1 and block 3. The checksum for block 3 is stored within block 1. Finally, checksum 612 for block 1 is stored outside of all three blocks. In this example, the checksum for block 1, to be stored in data structure 612, cannot be computed until after the checksum value 622 for block 2 and the checksum value 632 for block 3, both contained within block 1, are first computed and stored. Likewise, the checksum value 632 for block 3 cannot be computed until the checksum value 622 for block 2, contained within block 3 is first computed and stored. Thus, in this example, checksums must be processed in the following order: block 2, block 3, block 1. In an alternate embodiment, checksum data structures can be skipped over when computing checksums, thus eliminating the dependencies. However, this places all checksums outside the protection envelope, and also increases the burden of complexity for generating random sized code blocks that do not include within them checksum data structures, forcing blocks to begin and end on either side of the checksum data structure.

Figure 9:
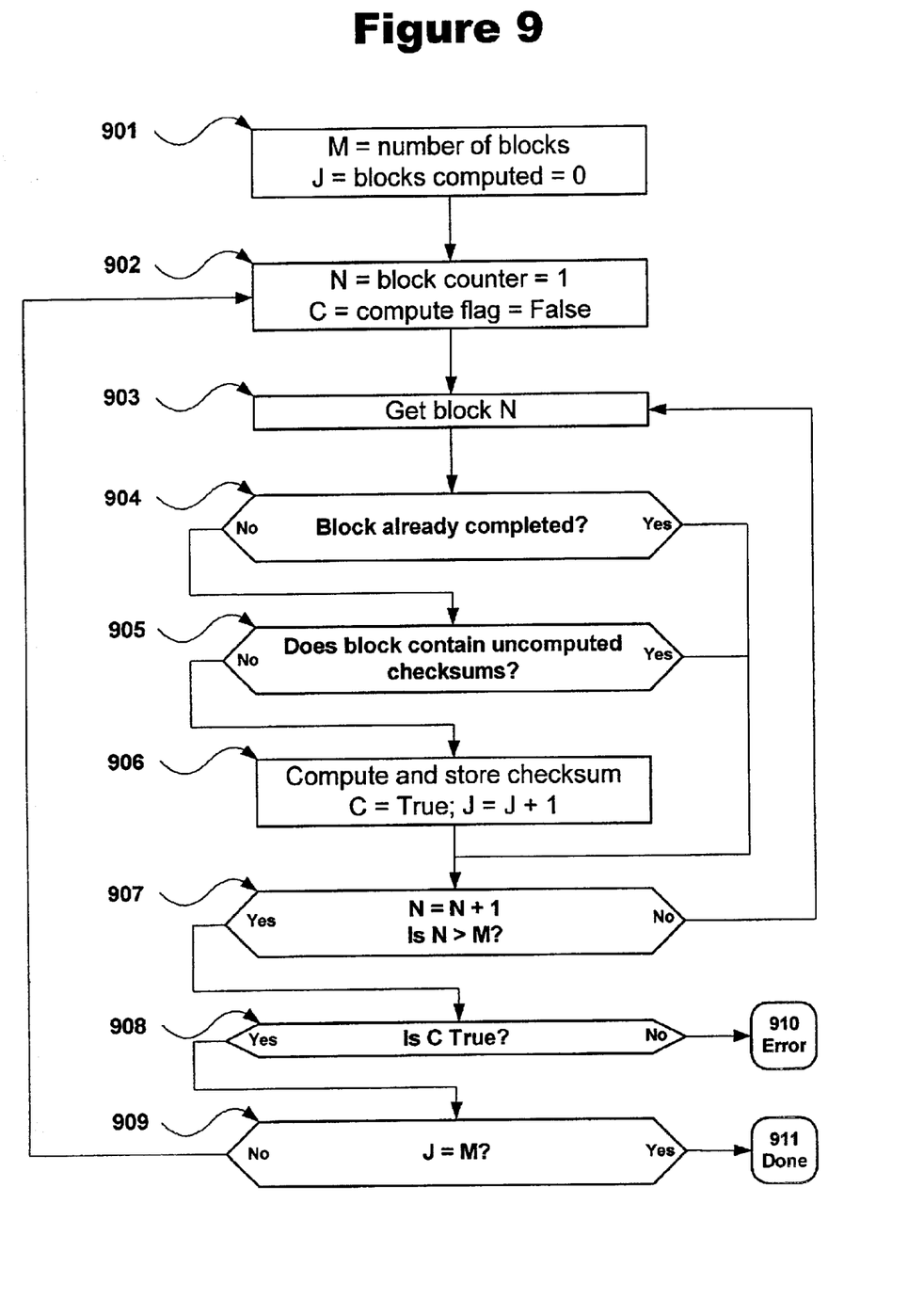
FIG. 9 is a flow diagram for an algorithm for handling multiple overlapping blocks.

Referring now to FIG. 9, a flow diagram for an algorithm for processing checksums for multiple overlapping blocks is shown. This is only one possible implementation of an algorithm to process checksums in proper order, and to issue an error message if the arrangement of blocks and data structures cannot be processed. An example of an arrangement that cannot be processed is two blocks, each with the checksum data structure from the other block located within it. Neither checksum can be computed, because the data within the related block is incomplete, including as it does a value not yet computed—the checksum of the other block. In this case, the required processing of checksums is a closed loop, and thus there is no entry point to allow completion of the processing.

The algorithm begins within step 901, where variable M is set to the number of blocks, and variable J, the blocks processed count, is set to 0. When a checksum is computed, variable J will be incremented. When variable J reaches the same value as variable M, all blocks have been processed.

Next, in step 902, a block scan counter variable N is set to 1, the first block. A Boolean variable C is set to False. Variable C will be set to True any time a block is processed in a given scan cycle. A scan cycle is a scan through all M blocks looking for a block to process. If there are unprocessed blocks, and a complete scan results in no blocks that can be processed, than an error condition exists, and an error is reported.

In step 903, the block scan loop begins, accessing block N values. Specifically, the starting and ending address of block N are accessed, as well as the location of the checksum data structure associated with block N.

In step 904, a check is made to see if this block has already been computed in previous loops. If so, control is transferred to step 907. If not, control continues with step 905.

In step 905, a check is made to see if there are any checksum data structures within the block that have not yet been computed. This is accomplished by scanning all N checksum data structures to see if any are within the current block, block N, and if they have already computed checksums. In the preferred embodiment, uncomputed checksums are detected by a zero value in the checksum field 421. Checksums must have a non-zero value in this case, and the value must be initialized in the source code to zero. Alternatively, a separate array can be maintained by the program to indicate if values have been computed for each block, or a flag can be stored in the checksum data structure. For example, the sign bit of the selector could be used to indicate that the checksum has been generated.

If a block contains uncomputed checksums, then control is transferred to step 907. Otherwise, processing continues to step 906, where the checksum is computed for the block using the selected algorithm and stored in the checksum data structure field 421. If a checksum computed array is being maintained, the nth element is set to a value of True at this point. If the sign of the selector is being used, it is set at this point. Next, the variable C is set to a value of True to indicate that this pass through the blocks has found at least one block to process. Finally, the blocks processed variable J is incremented, and control passes to step 907.

In step 907, the block scan counter variable N is incremented and compared to M, the total number of blocks. If the counter N is larger than M, than this block scan is complete, and processing continues to step 908. Otherwise, control is transferred back to step 903 to continue the block scan.

If a block scan has just completed, step 908 executes, and the variable C is tested. If no blocks were processed during the last block scan (C=False), then an error condition exists, and the processing ends with step 910. Typically, an error dialog is provided to the user at this point. If at least one block was processed during the scan (C=True), processing continues in step 909.

In step 909, the blocks processed counter variable J is compared to the number of blocks M. If the values are equal, all blocks have been processed, and the program completes at step 911. Otherwise, control is returned back to step 902, where a new block scan is initiated.

In the example shown in FIG. 6 of overlapping blocks, only two block scans would be required. During the first scan, block 2 and block 3 would be processed. During the second scan, block 1 would be processed. The algorithm would complete at step 911 after the second scan, because at that point J would be equal to 3, the number of blocks.

Many variations of this invention are possible. For example, it can be assumed that every block ends with the checksum data structure. In this case, only a start symbol and data structure symbol are required. Likewise, the block can be assumed to be the entire program from beginning to end, where the checksum data structure is skipped over during the computation of the checksums both at wrap time and at run-time. Other approaches will be apparent to one skilled in the art, and will not be described in detail herein.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into a computer for execution. Accordingly, many modifications may be made by one of ordinary skill in the art without departing from the spirit and scope of the appended claims.

What is claimed is:

1. A method for performing runtime checksum validation of a software program, the method comprising the steps of:
   (a) providing a software tool as well as instructions on how to modify the software program to submit to the tool, wherein executable code is generated from the modified software program that includes checksum information for the tool to use when processing the software program;
   (b) in response to the executable code being submitted to the tool, the tool calculates at least one checksum, embeds the checksum in the executable code in a location indicated by the checksum information, and strips the checksum information from the executable code; and
   (c) delivering the executable code as a protected software program, wherein during execution, the protected software application generates a new checksum and determines that the software application has been modified if the new checksum fails to match the embedded checksum.

2. The method of claim 1 further includes the step of storing the checksum in a checksum data structure, the location of which is specified in the checksum information.

3. The method of claim 2 further including the step of detecting overlapping code block definitions and checksum data structure locations such that for any data structure located within a defined block, the checksum results for the block associated with the data structure are computed and stored prior to the checksum calculation for the containing block, thus allowing chaining of checksum calculations for multiple blocks.

4. The method of claim 3 further including the generation of an error message when chaining of computations forms a closed loop, and thus cannot be completed.

5. The method of claim 1 wherein step (a) further includes the step of providing in the checksum information the location of a block and the location for the checksum for each block of the protected software program for which a checksum is required.

6. The method of claim 5 further includes the step of providing a checksum algorithm selector in the checksum information.

7. The method of claim 1 further including the step of providing source code for one or more checksum algorithms to the application developer for including in the application for the purpose of computing the checksums at runtime, whereby the developer may obfuscate the checksum algorithm code by making modifications to the code, such that the compiled algorithm code cannot be easily located by a pattern-matching search.

8. The method of claim 1 further including the step of selecting checksum algorithms that allow computation of the checksum for a code block using random sized sequential segments from the code block being validated, such that the work of computing the checksum may be spread over a time period using only small portions of CPU processing power, thereby making detection of the checksum process more difficult.

9. A method for runtime code integrity validation of an application program using code block checksums, the method comprising the steps of:
   (a) detecting a first set of exported symbols in a software application defining a start and end of one or more defined code blocks to be validated;
   (b) detecting a second set of exported symbols in the software application defining the location of a checksum data structure for each defined code block where computed checksums are to be stored;
   (c) computing a checksum of the defined blocks and storing the computed checksum in the defined data structures;
   (d) stripping from the software application the detected sets of exported symbols to obfuscate the defined blocks and data structures; and
   (e) storing the software application with the obfuscated code blocks and data structures, such that the application can verify the integrity of the code blocks during runtime by computing a runtime checksum for the code blocks and comparing the runtime checksum with the checksum stored in the data structures.

10. The method of claim 9 wherein step (c) further includes the step of:
   (i) selecting from a plurality of supported checksum algorithms using a selector stored within the data structure.

11. The method of claim 9 further including the step of detecting the exported symbols by using a defined naming convention.

12. The method of claim 9 further including the step of detecting overlapping code block definitions and data structure locations such that for any data structure located within a defined block, the checksum results for the block associated with the data structure are computed and stored prior to the checksum calculation for the containing block, thus allowing chaining of checksum calculations for multiple blocks.

13. The method of claim 12 further including the generation of an error message when chaining of computations forms a closed loop, and thus cannot be completed successfully.

14. The method of claim 9 further including the step of providing source code for one or more checksum algorithms to the application developer for including in the application for the purpose of computing the checksums at runtime, whereby the developer may obfuscate the checksum algorithm code by making modifications to the code, such that the compiled algorithm code cannot be easily located by a pattern-matching search.

15. The method of claim 9 further including the step of selecting checksum algorithms that allow computation of the checksum for a code block using random sized sequential segments from the code block being validated, such that the work of computing the checksum may be spread over a time period using only small portions of CPU processing power, thereby making detection of the checksum process more difficult.

16. A method for runtime code integrity validation of an application program using code block checksums, the method comprising the steps of:
(a) detecting an exported symbol in a software application defining the location of a checksum data structure where the computed checksum is to be stored;
(b) computing the checksum of the application program, skipping over the data structure, and storing the results in the data structure;
(c) stripping from the application program the detected exported symbol to obfuscate the location of the data structure; and
(d) generating a software application executable object with the obfuscated data structure such that the application code can verify the integrity of the code during runtime by computing the checksum of the application not including the data structure and comparing the result with the result stored in the data structure.

17. The method of claim 16 wherein step (b) further includes the step of:
(i) selecting from a plurality of supported checksum algorithms using a selector stored within the data structure.

18. The method of claim 16 further including the step of providing source code for one or more checksum algorithms to the application developer for including in the application for the purpose of computing the checksums at runtime, whereby the developer may obfuscate the checksum algorithm code by making modifications to the code, such that the compiled algorithm code cannot be easily located by a pattern-matching search.

19. The method of claim 16 further including the step of selecting checksum algorithms that allow piecewise incremental computation of the checksum for a code block using random sized sequential segments from the code block being validated, such that the work of computing the checksum may be spread over a time period using only small portions of CPU cycles, thereby making detection of the checksum process more difficult.

20. A method for runtime code integrity validation of an application program using code block checksums, the method comprising the steps of:
(a) selecting one or more code blocks of the application program to be validated, and indicating the start and end of the selected code blocks using exported symbols;
(b) defining a checksum data structure for each defined block and indicating its location using exported symbols;
(c) incorporating one or more checksum algorithms within the code for computing checksums at runtime; and
(d) incorporating code to request the computation of the checksum at runtime for each defined block, and to compare the results of the runtime checksum calculation with the value stored in the related checksum data structure;
(e) incorporating code to discourage use of the application program when the checksums do not validate; and
(f) processing the application program code using a tool that performs the functions of:
(i) locating the defined code blocks using the exported symbols,
(ii) computing the checksum of each block and storing the results in the data structure for each block located using the exported symbols, and
(iii) stripping the exported symbols from the application code to obfuscate the location of the blocks and data structures.

21. The method of claim 20 further including the step of modifying the checksum algorithm code to obfuscate the compiled code so that the algorithm cannot easily be located by pattern matching.

22. The method of claim 20 further including the step of selecting from a plurality of checksum algorithms such that both the processing step checksum calculation and the runtime calculation uses the same checksum algorithm by storing a algorithm selector in the checksum data structure, and using this selector during both the processing step and at runtime to execute the same selected checksum algorithm for the defined block.

23. The method of claim 20 further including the step of selecting checksum algorithms that allow piecewise incremental computation of the checksum for a code block using random sized sequential segments from the code block being validated, such that the work of computing the checksum may be spread over a time period using only small portions of CPU cycles, thereby making detection of the checksum process more difficult.

24. The method of claim 23 further including the step of computing sequential portions of the checksum for any given block at selected time periods during execution of the application program, thereby increasing the difficulty of locating the validation code.

25. The method of claim 23 further including the step of computing sequential portions of the checksum for any given block from multiple locations within the application program, thereby increasing the difficulty of locating the validation code.

26. The method of claim 20 further including the step of delaying the action taken after detecting a checksum validation failure, thereby obfuscating the code invalidating the checksum by the time elapsed and volume of code executed between the invalidation and the visible occurrence of the resulting action taken.

27. A method for determining if protected software is modified, the method comprising the steps of
(a) instructing a software developer to modify an executable version of the software to be protected by performing the steps of:

(i) exporting predefined checksum related data,
(ii) adding code to compute a new checksum at runtime,
(iii) adding code to compare the computed runtime checksum with a checksum stored in the executable,
(iv) determining that the protected software has been modified if the checksums do not compare; and
(b) wrapping the executable in a anti-piracy software wrapper, and performing the steps of:
(i) automatically detecting the exported checksum related data,
(ii) computing a checksum of the executable,
(iii) embedding the checksum in the executable; and
(iv) removing the exported checksum related symbols from the executable.

28. The method of claim 27 further including the step of: in response to determining that the software has been modified, taking an action at a time delayed from a time of detection.

29. The method of claim 27 wherein step (a) further includes the step of: exporting a starting and ending address of a program block and a checksum data structure to receive the computed checksum of the program block as the checksum-related data.

30. The method of claim 29 further including the step of including in the checksum data structure a checksum algorithm selector wherein one of a plurality of checksum algorithms may be selected for a given block.

31. The method of claim 29 further including the step of including more than one start and ending address and checksum data structures.

32. A computer-readable medium containing program instructions for runtime code integrity validation of an application program using code block checksums, the instructions for:
(a) detecting a first set of exported symbols in a software application defining a start of one or more defined code blocks to be validated;
(b) detecting a second set of exported symbols in the software application defining the end of a defined code block and the location of a checksum data structure for each defined code block where computed checksums are to be stored;
(c) computing a checksum of the defined blocks and storing the computed checksum in the defined data structures;
(d) stripping from the software application the detected sets of exported symbols to obfuscate the defined blocks and data structures;
(e) storing the software application with the obfuscated code blocks and data structures, such that the application can verify the integrity of the code blocks during runtime by computing a runtime checksum for the code blocks and comparing the runtime checksum with the checksum stored in the data structures.

33. The computer-readable medium of claim 32 wherein instruction (c) further includes the instruction of:
(i) selecting from a plurality of supported checksum algorithms using a selector stored within the data structure.

34. The computer-readable medium of claim 32 further including the instruction of detecting the exported symbols by using a defined naming convention.

35. The computer-readable medium of claim 32 further including the instruction of providing source code for one or more checksum algorithms to the application developer for including in the application for the purpose of computing the checksums at runtime, whereby the developer may obfuscate the checksum algorithm code by making modifications to the code, such that the compiled algorithm code cannot be easily located by pattern matching.

36. The computer-readable medium of claim 32 further including the instruction of selecting checksum algorithms that allow piecewise incremental computation of the checksum for a code block using random sized sequential segments from the code block being validated, such that the work of computing the checksum may be spread over a time period using only small portions of CPU cycles, thereby making detection of the checksum process more difficult.

* * * * *